United States Patent [19]

Stierman et al.

[11] Patent Number: 5,158,603
[45] Date of Patent: Oct. 27, 1992

[54] PROCESS OF EXTRACTING ANIONS WITH QUATERNARY AMINES

[75] Inventors: Thomas J. Stierman; Michael J. Virnig, both of Santa Rosa, Calif.; Gary A. Kordosky, Tucson, Ariz.

[73] Assignee: Henkel Research Corporation, Santa Rosa, Calif.

[21] Appl. No.: 490,122

[22] Filed: Mar. 6, 1990

[51] Int. Cl.$^5$ .............................................. C01G 55/00
[52] U.S. Cl. ........................................ 75/743; 423/22; 521/31; 521/32
[58] Field of Search .............. 75/743; 423/22; 521/31, 521/32

[56] References Cited

U.S. PATENT DOCUMENTS

| | | | |
|---|---|---|---|
| 4,012,481 | 3/1977 | Baltz | 75/732 |
| 4,041,126 | 8/1977 | Baltz | 423/22 |
| 4,272,288 | 6/1981 | Dessau | 423/22 |
| 4,543,169 | 9/1985 | D'Agostino | 423/22 |
| 4,661,257 | 4/1987 | Kreevoy et al. | 210/638 |
| 4,726,841 | 2/1988 | Grant | 423/22 |
| 4,774,003 | 9/1988 | Miller et al. | 210/638 |
| 4,814,007 | 3/1989 | Lin et al. | 75/118 R |

FOREIGN PATENT DOCUMENTS

| | | |
|---|---|---|
| 587403 | 11/1959 | Canada . |
| 714981 | 7/1971 | South Africa . |
| 892733 | 4/1989 | South Africa . |

OTHER PUBLICATIONS

Selectivity Consideration . . . Cyanide Solutions -Minerals & Met. Proc. Aug. 8, 1984; 153-7.
Ion Exchange Proc. . . . Cyanide Solution-Ind. & Eng. Chem. -vol. 45, No. 8; Aug. 1953 1648-58.
Karl Schugerl and Wolfgang Degener, Gewinnung Niedermolekularer Oganischer Verbindungen aus Komplexen Wabringen Gemischen durch Extraktion, Chem. Ing. Tech. 61, No. 10, 796-804 (1989).

Primary Examiner—Peter D. Rosenberg
Attorney, Agent, or Firm—Ernest G. Szoke; Wayne C. Jaeschke; Patrick J. Span

[57] ABSTRACT

An improved extraction system employing a quaternary amine to extract anions from an aqueous solution, particularly precious metals such as gold or silver from an aqueous alkaline solution. The improvement comprises the use of a weak organic acid (a compound providing an acidic proton) along with the quaternary amine. The improvement is useful in both liquid-liquid and liquid-solid extraction systems.

44 Claims, No Drawings

PROCESS OF EXTRACTING ANIONS WITH QUATERNARY AMINES

BACKGROUND OF THE INVENTION

1. Field of the Invention

This invention relates to an improved process for extraction of anions, particularly complex anions such as auricyanide, from aqueous solutions employing quaternary amine extraction reagents in either liquid-liquid or liquid-solid systems.

2. Description of Related Art

Clarified leach liquors containing the gold are obtained by leaching with cyanide solutions through either the dump or heap leaching techniques. In heap leaching, the ore is placed on specially prepared impervious pads and a leaching solution is then applied to the top of the heap and then allowed to percolate down through the heap. The solution containing the dissolved metal values eventually collects along the impervious pad and flows along it to a collection basin. From the collection basin, the solution is pumped to the recovery plant. Dump leaching is similar to heap leaching. Old mine waste dumps which have sufficient metal value to justify processing are leached in place. The gold in clarified leach solutions may be recovered by direct precipitation in the Merrill-Crowe process, or by adsorption on charcoal in columns (CIC), followed by either electrowinning or by precipitation in the Merrill-Crowe process.

In certain conditions, unclarified solutions are generated by agitated vat leaching. In this continuous Carbon in Pulp (CIP) leaching process, the ore is slurried with agitated leach solution in the presence of carbon granules to generate a pulp. Dissolved gold is adsorbed onto the carbon resulting in low aqueous gold concentrations, which often increases the rate and completeness of gold extraction from the ore. Carbon granules carrying the gold are separated from the pulp by screening, and the gold is recovered from the carbon typically by elution with sodium hydroxide solution, which may contain some free cyanide, followed by electrowinning. Before the carbon granules can be returned to the leaching step, they must be reactivated by hazardous and expensive washing and heating steps. Coconut shell activated carbon is preferred, but is in short supply and expensive.

That one can effectively extract auricyanide from alkaline cyanide leach liquors with quaternary amines either as solvent extraction reagents or as functionality mounted on a resin is well known. The use of the quaternary amine functionality for the recovery of gold in the mining industry is limited, however, by the fact that recovery of the auricyanide away from the quaternary amine is very difficult.

Stripping of the auricyanide away from the quaternary amine is currently accomplished by multi-step processes involving acidification and generation of HCN gas at some stage. As a result, these processes involve substantial cost and risk due to the necessity of recovering and recycling HCN. One process involves contacting the loaded extractant (solution or resin) with an aqueous acidic solution of thiourea. The auricyanide anion is converted to a cationic gold thiourea complex which no longer is attracted to the quaternary amine, and the cyanide is released as HCN gas, which is very toxic. Due to the cost of cyanide, it is necessary to recover the HCN by neutralization with caustic. An alternate approach, which is finding some use, involves displacing the auricyanide from the loaded extractant by contact with an alkaline tetracyanozinc solution. The tetracyanozinc anion is preferentially extracted by the quaternary amine and displaces the auricyanide from the extractant phase. Removal of the tetracyanozinc species from the extractant then requires contacting with an aqueous sulfuric acid solution with resultant HCN generation.

Alternate ways which have also been suggested as possible routes for recovering auricyanide away from the quaternary amine include burning the loaded extractant. This approach suffers from the fact that one destroys the extractant, and it is uneconomic except in cases such as waste treatment where no mining costs are incurred, or where a very high level of loading has been achieved.

More specifically in regard to extraction of anions, such as auricyanide using amine, may be mentioned Canadian Patent 587,403 to Kember et al., in which the recovery of gold from aqueous cyanide gold bearing solutions using ion exchange resins having at the majority of positions primary, secondary or tertiary amine groups but containing up to 25% quaternary ammonium groups.

Miller and Mooiman in U.S. Pat. No. 4,774,003 and their published article, "Selectivity Consideration in the Amine Extraction of Gold from Alkaline Cyanide Solutions, Minerals and Metallurgical Processing", August, 1984, pp. 153-157, describe the ion exchange extraction of metallic and non-metallic anions by control of the basicity of primary, secondary and tertiary amines with Lewis bases, such as tributylphosphate. The publication notes on page 153 that quaternary amines have been studied for extraction of gold but that while extraction was possible, stripping was difficult.

Burstall, F. H. et al. in "Ion Exchange Process for Recovery of Gold from Cyanide Solution", Industrial and Engineering Chemistry, Vol. 45, No., 8, August, 1953, pp. 1648-1658, describe an investigation into the absorption of gold from cyanide solutions using a strongly basic resin Amberlite IRA-400.

More recently, guanidine reagents have been proposed for extraction of precious metals, such as gold, from aqueous, alkaline, cyanide solutions, notably in Henkel Corporation, U.S. Pat. Nos. 4,814,007 to Wilson Lin et al. Other patents utilizing guanidine compounds are South African Patent 71/4981 for extraction of gold from aqueous acidic solutions and South African Patent 89/2733 describing a similar process for recovering gold from alkaline cyanide solutions.

In U.S. Pat. No. 4,661,257, quaternary ammonium salts are described for use in ion transport processes which employ supported liquid membranes. In this process the quaternary amine cation forms an ion pair with a target anion, such as nitrate and a counterion, such as phenolate, is used for a high affinity for hydrogen ion.

DESCRIPTION OF THE INVENTION

It has now been discovered that the extraction process using quaternary ammonium reagents for extraction of anions from aqueous solutions, particularly complex anions from aqueous, alkaline solutions, can be improved by the use of weak organic acids employed in combination with the quaternary amine. By "weak organic acid" is meant herein a water insoluble organic compound which will provide an acidic proton and have a $pK_a$ as measured in water in the range of about 8-12. The weak organic acid provides a pH dependent counterion thereby providing a means of controlling the pH behavior of the quaternary amine to extract the desired anion. In the absence of a weak organic acid, the quaternary amine functionality is independent of pH, and cannot be stripped of the desired anion by use of aqueous alkaline solutions. With this improved process, quaternary amine compounds provide a method of extraction not subject to the disadvantages found earlier in using quaternary compounds as extractant reagents, and resort to other extractants need not be made.

Generally, the process may be described as a process of extracting an anion from an aqueous solution containing said anion comprising:
(1) contacting said aqueous solution containing said anion with a quaternary amine extraction reagent and a weak organic acid whereby said anion is extracted from said aqueous solution;
(2) separating said quaternary amine extraction reagent now containing said anion from said aqueous solution; and
(3) recovering said anion from said quaternary amine reagent;
said quaternary amine having a cation of the formula

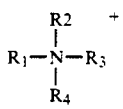

where the R groups $R_1$ through $R_4$ are selected from the group consisting of an ion exchange resin matrix or backbone and a hydrocarbon radical having up to 25 carbon atoms, and said weak organic acid having a $pK_a$ as measured in water in the range of about 8-12.

The quaternary amine compounds in combination with the weak organic acids are useful for extracting anions, and particularly the metal complex anions, such as the precious metals. The invention herein is particularly useful in the extraction of gold from aqueous, alkaline, cyanide solutions in which the gold is present as auricyanide, the complex anion Au(CN)2. The invention is applicable however to other metal anions, including those of silver, vanadium, tungsten, cobalt, nickel, copper, zinc, chromium, molybdenum, cadmium, manganese, iron, palladium, platinum, rhodium, and the like, as well as to non-metal anions such as sulfate, cyanide, thiocyanate, and water soluble organic acids having a $pK_a$ less than 7, preferably about 2-6. While particularly useful with the metallo cyano complex anions, the invention also finds utility with the thioanionic, such as thiocyano, oxyanionic, such as molybdate, and chloroanionic, such as tetrachloropalladate and tetrachlorozincate complexes.

The invention is generally applicable to the use of a weak organic acid and a quaternary amine containing reagent phase to enable one to control extraction and stripping by adjustment of pH, and is useful in both liquid-liquid systems and liquid-solid systems.

In a liquid-liquid system, the reagent (quaternary amine and weak organic acid) must be soluble in an organic solvent which is immiscible in relation to the aqueous, cyanide leach solution in the case of gold extraction. Thus, the quaternary amine reagent is dissolved in the organic solvent, and the weak organic acid simply added to this organic phase, which is then brought in contact with the aqueous cyanide solution containing the desired metal value, gold in this instance, present as the auricyanide anion. While the invention is specifically described herein in relation to aqueous, alkaline cyanide solution containing gold, it is to be understood that the description is applicable to other metals and other aqueous solutions containing metal anions or non-metal ions desired or selected for extraction and recovery. While the invention is not limited thereto, such solutions typically have a pH as low as about 5. However, the invention is particularly suited to alkaline solutions, i.e., those having a pH above 7. The water immiscible organic solution after contact with the aqueous solution extracts the desired anion from the aqueous solution, which anion is now found in the organic phase which is immiscible with the aqueous phase. After separation of the organic phase from the aqueous phase due to immiscibility, the organic phase containing the desired anion is then stripped by contact with an aqueous caustic solution which strips the desired anion from the organic phase. The desired values, metal or non-metal, now in a more concentrated aqueous solution are then recovered by conventional methods, in the case of gold such as electrowinning.

In the liquid-solid system, the quaternary amine groups are first incorporated onto a solid, ion exchange resin matrix or carrier, or backbone and simple absorption of the weak organic acid on the surfaces of the quaternary amine functionalized resin is sufficient. In the case of a gold containing aqueous, alkaline, cyanide solution, recovery of the gold is accomplished by contacting the cyanide solution with the ion exchange reagent carrier containing the quaternary amine groups and having the weak organic acid absorbed thereon, at which point the desired metal value is extracted from the aqueous cyanide solution onto the ion exchange carrier containing the quaternary amine functionality. The aqueous solution is separated from the carrier containing the quaternary amine and desired anion, which is then stripped or eluted from the ion exchange carrier and recovered in the same manner as in the liquid-liquid method.

The weak acid must be chosen so that it is essentially water insoluble or provisions must be made to continuously replenish the level of the weak acid to maintain an effective concentration of the weak acid in the reagent phase. The $pK_a$ of the weak acid must be such that the quaternary amine will extract auricyanide from typical cyanide leach liquors having a pH of 9.5-10.5 and undergo stripping when the loaded organic is contacted with a caustic aqueous solution having a pH of 13-13.5. In practical terms, this means that at a pH of 9.5-10.5, the acid is un-dissociated and therefore is neutral. As a result of its non-ionic state, the un-dissociated acid is not capable of forming an ion pair with the positive charge on the quaternary amine, and the quaternary amine is therefore free to extract the anionic auricyanide complex to neutralize its positive charge. When contacted with a pH 13-13.5 strip solution, the acid becomes deprotonated to give an anion. Due to its hydrophobicity, this acid anion remains in the organic phase. In order to maintain charge neutrality in the organic phase, the auricyanide anion is displaced into the aqueous phase and the acid anion associates with the quaternary amine. Weak organic acids, those providing an acidic proton, having suitable solubility characteristics and $pK_a$ behavior are alkylphenols, such as nonylphenol, dodecylphenol; fatty beta-diketones, such as 1-phenyl-1,3-isodecanedione; alkylbenzenesulfonamides, such as dodecylbenzenesulfonamide; phenolic aldehydes, such as dodecylsalicylaldehyde; phenolic ketones, such as 5-nonyl-2-hydroxyphenyl methyl ketone, and hydroxyaryl aldoximes or ketoximes, such as 2-hydroxy-5-(nonyl or dodecyl)benzaldoxime and 2-hydroxy-5-(nonyl or dodecyl)phenyl methyl ketone oxime.

The foregoing compounds (phenols, phenolic aldehydes, phenolic oximes, sulfonamides and beta-diketones) all provide an acidic proton and may be further illustrated generally by the formulae:

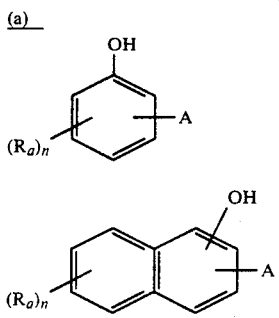

where $R_a$ is a hydrocarbon group having up to 25 carbon atoms, n is an integer of 0 to 4, and A is H or an electron-withdrawing substituent selected from the group consisting of chloro, bromo, $-C(=O)R_b$, or $-C(=NOH)R_b$, where $R_b$ is H or a hydrocarbon group having 1 to about 25 carbon atoms, and provided that the total number of carbon atoms in $R_a$ and $R_b$ is from 6-30;

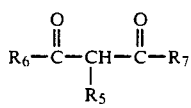

where $R_5$ is H or a hydrocarbon group having 1 to about 25 carbon atoms, $R_6$ is a hydrocarbon group having 1 to about 25 carbon atoms, $R_7$ is a hydrocarbon group having 1 to about 25 carbon atoms, and provided the total number of carbon atoms in $R_5$, $R_6$ and $R_7$ is 10 to 30;

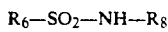

where $R_6$ is as defined above, $R_8$ is H or a hydrocarbon group having 1 to about 25 carbon atoms, and provided the total number of carbon atoms in $R_6$ and $R_8$ is 10 to 30.

In the foregoing formulae, the preferred hydrocarbon groups $R_a$ are alkyl groups, such as heptyl, octyl, nonyl, decyl or dodecyl, and n is 1. In formula (b) it is preferred that $R_6$ is an unsubstituted phenyl group, $R_5$ is H, and $R_7$ is heptyl. In formula (a) it is preferred that A is H, $-C(=O)R_b$ or $-C(=NOH)R_b$, where $R_b$ is H or methyl. In the formulae above, the term hydrocarbon includes aliphatic, cycloaliphatic, aromatic, and aliphatic substituted aromatic groups, and the groups may be the same or different, saturated or unsaturated, and straight or branched chain.

In general, weak organic acids having a $pK_a$ in the range of 8-12 in water will be acceptable, particularly for gold extraction, with the most desirable $pK_a$ being about 9-11. In general, about 1 to about 5 moles of weak acid per mole of quaternary amine functionality is employed to achieve good stripping performance. Optimal performance will vary depending on the specific weak acid and specific quaternary amine, and the amounts thereof. For example, optimum performance is generally obtained with a ratio of about 2-3 moles of an alkylphenol, such as nonylphenol, per mole of a quaternary amine, such as tri(C8-C10)methyl ammonium chloride.

The liquid-liquid process of the invention is one in which the water insoluble quaternary ammonium compound is dissolved in an essentially water immiscible, water insoluble, organic liquid hydrocarbon solvent. A wide variety of essentially water-immiscible liquid hydrocarbon solvents can be used in the metal recovery process of the present invention. These include: aliphatic and aromatic hydrocarbons such as kerosenes, benzene, toluene, xylene and the like. A choice of the essentially water-immiscible liquid hydrocarbon solvents, or mixtures thereof, for particular commercial operations will depend on a number of factors, including the design of the solvent extraction plant (i.e. mixer-settler units, Podbielniak extractors, etc.), the value of the metal being recovered, and the like. The process of the present invention finds particular use in the extraction recovery of the precious metals such as gold and/or silver. The preferred solvents for use in these precious metal recovery processes of the present invention are the aliphatic and aromatic hydrocarbons having flash points of 150.F. and higher and solubilities in water of less than 0.1% by weight. The solvents are also essentially chemically inert. Representative commercially available solvents are Chevron Ion Exchange Solvent (available from Standard Oil of Calif.—flash point 195° F.), Escaid 100 and 110 (available from Exxon-Europe—flash point 180° F.), Norpar 12 (available from Exxon-USA—flash point 160° F.), Conoco-C1214 (available from Conoco—flash point 160° F.), Exxon Aromatic 150 (an aromatic kerosene available from Exxon-USA—flash point 150° F.), and the various other kerosenes and petroleum fractions available from other oil companies. In the process of the present invention, the organic solvent solutions will preferably contain from about 0.005 to 20% by weight of the quaternary amine compound and even more preferably from about 0.01-1% by weight thereof. Additionally, volume ratios of the organic:aqueous phase vary widely since the contacting of any quantity of the quaternary amine solution with the metal containing aqueous phase will result in extraction of metal values into the organic phase. However, for commercial practicality, the organic:aqueous phase ratios are preferably in, but not limited to, the range of about 50:1 to 1:100. In mixer-settlers, it is desirable to maintain an effective 0 to A ratio of about 1:1 in the mixer by recycle of one of the streams. For practical purposes the extracting and stripping are normally conducted at ambient temperatures and pressures, although higher and/or lower temperatures and/or pressures are entirely operable. Most advantageously, the entire process can be carried out continuously with the stripped organic solvent solution being recycled for contacting further quantities of the precious metal-containing cyanide solutions.

The extraction of the precious metals from their aqueous solution depends on a number of factors including, for example, the concentration of the metal ion, the particular anions present, and the pH of the aqueous solutions and the concentrations of and the particular quaternary amine used in the organic phase. Thus, for each aqueous metal solution and reagent solution of quaternary amine, there will be a preferred or optimum set of extraction conditions and those skilled in the art based on the information given herein, especially in respect of the examples to follow, will be able with a limited number of trial runs to determine such preferred or optimum conditions for the specific system under consideration. This is equally true of the stripping operations. By stripping is meant that at least a portion of the metal values in the loaded organic phase are transferred to the aqueous stripping medium. The metal values are then desirably recovered from the aqueous stripping medium by conventional techniques, preferably electrolysis. The loaded organic:aqueous stripping phase ratios can also vary widely. However, the overall object of the process is to provide a metal containing stripping solution of known composition and concentration suitable for the conventional recovery techniques such as by electrolysis. Thus, normally the metal will preferably be present in higher concentrations in the aqueous stripping medium than in the starting metal-containing solution. In this regard the starting aqueous metal-containing solutions may contain 1 to 5 ppm of gold, 1 to 2 ppm of silver and 5 to 10 ppm of copper plus traces of other metals. For example, a heap leach liquor will average 0.5 to 2 ppm gold, 0.5 to 2 ppm silver and 5 to 100 ppm copper plus other metals. The concentrations of gold in the aqueous strip solutions from which the gold will be recovered will be anywhere from about 50 to 1000 ppm. This will largely depend on the stripping solutions employed, the organic to aqueous ratio, and the efficiency thereof. In the stripping step, the loaded organic:aqueous stripping medium phase ratio may be as high as several hundred to one, but will preferably be in the range of about 1:1 to 100:1. The aqueous stripping solutions for use in the present invention will generally be basic stripping solutions having pH in excess of 11.0. The stripping reagent preferably employed is caustic sodium or potassium hydroxide solution having a pH above 11, generally 12 or above and preferably at least 13, which stripping solution may also contain cyanide anions. After removal of the metal from the aqueous stripping solution by conventional techniques, the caustic aqueous solution is recycled.

In the liquid-liquid system, the preferred quaternary amine compounds suitable may be defined simply as quaternary amine compounds having the cation

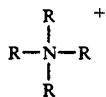

where R is a hydrocarbon radical containing up to 25 carbon atoms, and the sum of carbon atoms in all the R groups is at least 16. It is generally not necessary to exceed a total of about 40 carbon atoms. Preferably at least one of the R groups will have at least 6 carbon atoms and no more than 2 of the R groups will be methyl. The preferred quaternary amine is one in which three of the R groups are long chain aliphatic hydrocarbon or alkyl groups having at least 6 carbon atoms, such as tri($C_8$–$C_{10}$)methyl ammonium chloride, available from Henkel Corporation as ALIQUAT 336. Other quaternary amine compounds having at least two long chain alkyl groups having 6–10 carbon atoms are acceptable.

The foregoing description has dealt with the liquid/liquid extraction systems. As earlier indicated, liquid/solid systems can be employed, in which a quaternary amine reagent is incorporated into an ion exchange resin by chemically bonding the quaternary amine functionality to the resin backbone. In this regard, the term "extracting" used herein is to be understood as including both liquid and solid means for selectively removing and otherwise separating the precious metal values. As the ion exchange resin containing the quaternary amine functionality will be used to treat or contact an anion-containing aqueous solution, the ion exchange resin must be one which is water-insoluble. For example, upon contact of an aqueous cyanide solution containing precious metals, the precious metals are selectively absorbed on the ion exchange resin. The metal values are then eluted from the ion exchange resin by contact with the sodium hydroxide solution such as the stripping solution mentioned earlier above. The techniques employed in the production of water-insoluble ion exchange resins employed in the process of the present invention are well-known to those skilled in the art, and especially, to those skilled in the art of polymerizing monomers to produce polymeric compositions useful as ion exchange resins.

Resins containing quaternary amine functionality are readily available commercially such as the Amberlite 400 resin available from Rohm & Haas. Such resins also may initially contain hydroxyl (OH) functionality or chloride (Cl) counterions in addition to the quaternary amine functionality. Such resins are available commercially as Amberlite IRA 400(OH) and Amberlite IRA 400(Cl). In the present invention, this OH or Cl counterion is replaced with the anion of the weak acid.

Any ion exchange resin matrix or backbone which can carry the quaternary amine functionality as an active group may be employed. One group of suitable resin matrix or backbone is a chloromethylated polystyrene divinylbenzene polymer which upon chemical reaction with the appropriate tertiary amine provides the quaternary amine functionality. Such resins containing varying divinylbenzene (DVB) contents are well known to those skilled in the art. Polystyrene divinylbenzene resins containing up to 25% divinylbenzene (DVB) content may be employed. However, the preferred polystyrene resins will generally not exceed 13–15% DVB content with at least 3–4% being desirable and 8–10% being most preferred. Other resin matrix or backbone which is suitable are the urea formaldehyde or melamine formaldehyde resin.

The particle size of the ion exchange resin can vary widely, so long as the size range is generally fine enough to exhibit desirable loading and elution kinetics and yet large enough to (a) allow the solution to flow through the bed without binding or building up excess pressure; and (b) allow convenient screening of the resin from the aqueous solution Preferably, about a 6–12 mesh size is employed. The loading of the water-insoluble ion exchange resins containing the quaternary amine and weak acid can vary widely. Generally, it will be determined by the bed-volume characteristics of the particular water-insoluble ion exchange resin. Typically, the flow rates through the ion exchange bed will be such as to assure effective absorption onto the water-insoluble ion exchange resins.

After the water-insoluble ion exchange resin containing the quaternary amine and weak acid functionality has been loaded with the precious metal values, the aqueous cyanide solution is separated from the ion exchange resin and the absorbed precious metal values are eluted from the ion exchange resin. The suitable eluants, as indicated, are the same as the aqueous stripping solutions employed in the liquid/liquid extraction process. The most efficient and effective eluent is an aqueous solution of sodium hydroxide having a pH above 11, more desirably above 12 and preferably at least 13.

The quaternary amine resin base extraction reagents may be defined by the following formula:

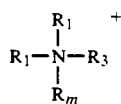

where $R_m$ represents the ion exchange resin matrix or backbone bonded to the nitrogen and the remaining R groups $R_1$ through $R_3$ are hydrocarbon groups containing up to 25 carbon atoms. The hydrocarbon groups may be the same or different, saturated or unsaturated, aromatic or aliphatic. Illustrative aliphatic (including cycloaliphatic) hydrocarbon groups are alkyl groups such as methyl, ethyl, propyl, butyl, hexyl, octyl, decyl, nonyl, dodecyl, oleyl and the like. A preferred reagent is one in which the R groups in the quaternized resin are methyl, such as in commercially available resin Amberlite IRA 400. To further illustrate the various objects and advantages of the present invention, the following examples are provided. It is understood that their purpose is entirely illustrative and in no way intended to limit the scope of the invention.

EXAMPLE I

Liquid-Liquid Extraction System

Typical solvent extraction experiment

The solvent used in these solvent extraction processes was either Aromatic 150, an aromatic kerosene, or Escaid 110, an aliphatic kerosene. The extractant, tri(C-8-C10)methylammonium chloride (Aliquat 336, available from Henkel Corporation) was used in the solvent in a concentration of 10 mM. The weak acid, such as nonylphenol or 1-phenyl-1,3-isodecanedione (LIX 54, available from Henkel Corporation) was used in the solvent in a concentration of 5 to 100 mM. The organic solution also included 50 g/L tridecanol as a co-solvent.

The Au-only aqueous feed solution had the following composition: Au—as noted, 1 g/L NaCN, pH 10.8. The mixed-metal aqueous feed solution had the following composition: 10-15 mg/L Au, ca. 50 mg/L each Ag, Cu, Fe, Zn, 1 g/L NaCN, pH 10.8

The metal-loaded organic extraction solution was prepared by contacting an organic extraction solution such as that described above with a aqueous feed solution such as that described above and collecting the organic solution after contact and phase separation.

The aqueous strip solution had the following composition: 10 g/L NaOH, 5 g/L NaCN.

In the extraction experiments, the organic extraction solution (15 mL) and the aqueous feed solution (15 mL) were placed in a separatory funnel and contacted for 10 min. The phases were then allowed to separate. Each phase was filtered and collected. The aqueous phase was analyzed for metal concentration by atomic absorption spectroscopy (AAS), as was the original feed solution. In some experiments, the metal-loaded organic phase was also analyzed by AAS.

In the stripping experiments, the metal-loaded organic extraction solution (15 mL) and the aqueous strip solution (15 mL) were placed in a separatory funnel and contacted for 10 min. The phases were then allowed to separate. Each phase was filtered and collected. The aqueous phase was analyzed for metal concentration by atomic absorption spectroscopy (AAS).

The results of the foregoing described experiments are shown in the following Tables 1 through 7.

TABLE 1

McCabe-Thiele extraction isotherm: 10 mM Aliquat 336, 25 mM nonylphenol, mixed-metal aqueous feed solution

| organic/ aqueous ratio | metal concentration (mg/L) | | | | | | | |
|---|---|---|---|---|---|---|---|---|
| | in raffinate | | | | in loaded organic | | | |
| | Au | Ag | Cu | Zn | Au | Ag | Cu | Zn |
| 10/1 | 0.00 | 0.30 | 0.10 | 0.00 | 1.50 | 4.70 | 5.70 | 5.20 |
| 5/1 | 0.00 | 0.70 | 0.10 | 0.00 | 3.00 | 9.30 | 11.4 | 10.4 |
| 2/1 | 0.40 | 6.10 | 4.00 | 0.00 | 7.30 | 20.5 | 26.5 | 26.0 |
| 1/1 | 0.70 | 17.0 | 20.0 | 0.60 | 14.3 | 30.0 | 37.0 | 51.4 |
| ½ | 1.00 | 30.5 | 44.7 | 7.00 | 28.0 | 20.0 | 25.0 | 90.0 |
| 1/5 | 6.80 | 44.0 | 54.0 | 25.0 | 44.0 | 15.0 | 15.0 | 135 |
| 1/10 | 10.0 | 46.0 | 56.0 | 38.0 | 50.0 | 10.0 | 10.0 | 140 |

TABLE 2

McCabe-Thiele extraction isotherm: 10 mM Aliquat 336, 10 mM LIX 54, mixed-metal aqueous feed solution

| organic/ aqueous ratio | metal concentration (mg/L) | | | | | | | |
|---|---|---|---|---|---|---|---|---|
| | in raffinate | | | | in loaded organic | | | |
| | Au | Ag | Cu | Zn | Au | Ag | Cu | Zn |
| 2/1 | 0.00 | 0.20 | 0.00 | 0.01 | 8.20 | 13.6 | 13.6 | 13.9 |
| 1/1 | 0.10 | 1.60 | 0.55 | 0.02 | 16.2 | 25.7 | 26.6 | 27.9 |
| ½ | 0.30 | 4.70 | 3.23 | 0.07 | 32.0 | 45.2 | 47.8 | 55.6 |

TABLE 3

McCabe-Thiele stripping isotherm: 10 mM Aliquat 336, 25 mM nonylphenol, mixed-metal-loaded

| organic/ aqueous ratio | metal concentration (mg/L) | | | | | | | |
|---|---|---|---|---|---|---|---|---|
| | in strip aqueous | | | | in stripped organic | | | |
| | Au | Ag | Cu | Zn | Au | Ag | Cu | Zn |
| 10/1 | 160 | 320 | 300 | 970 | 12.5 | 0.90 | 0.00 | 0.40 |
| 5/1 | 83.0 | 164 | 148 | 470 | 6.60 | 0.40 | 0.00 | 0.00 |
| 2/1 | 48.0 | 66.0 | 59.0 | 187 | 3.20 | 0.00 | 0.00 | 0.00 |
| 1/1 | 26.0 | 32.0 | 29.5 | 94.0 | 1.60 | 0.00 | 0.00 | 0.00 |
| ½ | 13.0 | 16.5 | 14.5 | 46.0 | 0.90 | 0.00 | 0.00 | 0.00 |
| 1/5 | 5.70 | 6.20 | 5.50 | 19.0 | 0.20 | 0.00 | 0.00 | 0.00 |
| 1/10 | 3.40 | 3.20 | 3.00 | 9.50 | 0.10 | 0.00 | 0.00 | 0.00 |

TABLE 4

McCabe-Thiele stripping isotherm: 10 mM Aliquat 336, 10 mM LIX 54 mixed-metal loaded

| organic/ aqueous ratio | metal concentration (mg/L) | | | | | | | |
|---|---|---|---|---|---|---|---|---|
| | in strip aqueous | | | | in loaded organic | | | |
| | Au | Ag | Cu | Zn | Au | Ag | Cu | Zn |
| 2/1 | 16.6 | 81.1 | 97.0 | 94.3 | 25.1 | 7.00 | 4.60 | 24.5 |
| 1/1 | 12.7 | 42.2 | 47.9 | 49.6 | 20.7 | 5.40 | 3.30 | 9.80 |
| ½ | 8.80 | 21.7 | 23.8 | 25.9 | 15.8 | 4.20 | 2.20 | 7.60 |

TABLE 5 pH isotherm for Au extraction by 10 mM Aliquat 336 / 25 mM nonylphenol extraction solution
Au concentration in aqueous feed = 1010 mg/L

| pH of aqueous | Au extracted (mg/L) |
|---|---|
| 9.2 | 991 |

TABLE 5-continued pH isotherm for Au extraction by 10 mM Aliquat 336 / 25 mM nonylphenol extraction solution
Au concentration in aqueous feed = 1010 mg/L

| pH of aqueous | Au extracted (mg/L) |
|---|---|
| 9.7 | 928 |
| 10.2 | 808 |
| 10.4 | 783 |
| 10.6 | 689 |
| 10.9 | 596 |
| 11.9 | 350 |
| 12.5 | 220 |
| 13.1 | 190 |

TABLE 6

Effect of varying nonylphenol concentration on extraction of Au with Aliquat 336
Au concentration in aqueous feed = 107 mg/L

| [nonylphenol], mM | Aliquat 336/ nonylphenol molar ratio | Au extracted (mg/L) |
|---|---|---|
| 5 | 2.0 | 107 |
| 10 | 1.0 | 107 |
| 20 | 0.5 | 107 |
| 50 | 0.2 | 49.0 |
| 100 | 0.1 | 4.00 |

TABLE 7

Effect of varying nonylphenol concentration on stripping of Au from Aliquat 336 extraction solutions

| [nonylphenol], mM | Aliquat 336/ nonylphenol molar ratio | % Au stripped |
|---|---|---|
| 5 | 2.0 | 0.00 |
| 10 | 1.0 | 19.9 |
| 20 | 0.5 | 70.6 |
| 50 | 0.2 | 100 |
| 100 | 0.1 | 100 |

The loaded organic solutions used in the experiments summarized in this table were those that were metal-loaded in the experiments summarized in Table 6; i.e., the solutions used in the experiments summarized in this table contain the amount of Au listed in Table 6 for the solution with the corresponding nonylphenol concentration.

The data in Tables 1, 3, and 5 demonstrate that a mixture of Aliquat 336 and nonylphenol extracts auricyanide along with various other anionic metal cyanide complexes from a pH 10.8 feed solution and is stripped by contacting with a pH 13–13.5 aqueous. Similar data is presented in Tables 2 and 4 for a mixture of Aliquat 336 and LIX 54.

EXAMPLE II

Solid-Liquid Extraction System

Preparation of quaternary amine/weak acid resin for gold recovery

Amberlite IRA-400 (OH) resin is a resin with a quaternary amine functionality and a hydroxide group present as a counterion. The resin is also available with a chloride counterion as Amberlite IRA-400 (Cl). Each of these resins are available commercially from Rohm & Haas.

Amberlite IRA-400 (OH) resin (ca. 10 g) was placed in a gravity column over a small wad of glass wool. The resin was washed twice with three bed volumes of methanol (fresh methanol used for each wash). Five bed volumes of a 5% v/v solution of nonylphenol or 2-hydroxy-5-nonylacetophenone in methanol were passed through the column, followed by five bed volumes of methanol. This step results in the replacement of the hydroxide counterion with nonylphenoxide or nonylacetophenoxide as counterion.

The resin was then washed with five bed volumes of deionized water, flushed out of the column with deionized water, and collected via Büchner filtration. Infrared spectroscopy confirmed the presence of the deprotonated weak acid (either nonylphenoxide or 5-nonylacetophenoxide) on the resin.

The resins produced by treatment of Amberlite IRA-400 (OH) resin with nonylphenol or 2-hydroxy-5-nonylacetophenone will hereafter be referred to as Amberlite IRA-400 (nonylphenoxide) resin and Amberlite IRA-400 (nonylacetophenoxide) resin, respectively.

Typical resin extraction experiment

The aqueous feed solution had the following composition: ca. 1000 mg/L Au, 1 g/L NaCN, pH 10.8. The aqueous strip solution had the following composition: 10 g/L NaOH, 5 g/L NaCN.

In the extraction experiment, the weak-acid treated Amberlite IRA-400 (nonylphenoxide) or Amberlite IRA-400 (nonylacetophenoxide) resin (ca. 100 mg) was placed in a screw-cap bottle. Aqueous feed solution (25 mL) was added. The bottle was shaken on a mechanical shaker for 4 hours. The resin was then collected via Büchner filtration. The aqueous filtrate was analyzed for metal concentration by atomic absorption spectroscopy (AAS), as was the original feed solution.

In the stripping experiment, the collected resin from the above extraction experiment was placed in a fresh screw-cap bottle. Aqueous strip solution (25 mL) was added to the bottle, which was then shaken on a mechanical shaker for 4 hours. The resin was collected via Büchner filtration. The aqueous filtrate was analyzed for metal concentration by atomic absorption spectroscopy (AAS).

The results of this experiment can be seen from the following Table 8.

TABLE 8

Extraction of Au by Amberlite IRA-400 (nonylphenoxide) or Amberlite IRA-400 (nonylacetophenoxide) resin

| counterion (mg on resin resin | Au loaded on resin (mg Au/g resin) | Au stripped from resin (mg Au/g resin) | Au on resin after strip Au/g |
|---|---|---|---|
| nonyl- phenoxide | 240 | 59.8 | 180 |
| nonylaceto- phenoxide | 276 | 50.8 | 225 |

The data in Table 8 shows that if one starts with a typical quaternary amine functionalized resin unto which one has adsorbed an alkylated phenol, one can strip the auricyanide from the resin. These experiments were carried out with effectively one mole of phenol present per mole of quaternary amine. Increasing the level of phenol present to 3 moles per mole of quaternary amine functionality will result in even more effective stripping performance. An alternative way of accomplishing this type of system would be to synthesize a resin having the requisite phenol and quaternary amine functionality attached directly to the resin backbone.

EXAMPLE III

In this experiment other anions were used to assist stripping of gold from quaternary amine extractants. The weak acids employed where dodecylsalicylaldehyde, dodecylbenzene sulfonamide, LIX 54 noted earlier, 5-dodecylsalicylaldoxime (LIX 860, available from Henkel Corporation) and 2-hydroxy-5-nonylphenyl methyl ketone oxime (LIX 84 available from Henkel Corporation). The experimental procedures were as follows:

1. Extraction

The organic solvent used in these solvent extraction processes was the aliphatic kerosene, Escaid 110. The organic solution contained the extractant, Aliquat 336, tri($C_8$–$C_{10}$)methylammonium chloride, at a concentration of 10 mM, the weak acid at a concentration of 110 mM, and 50 g/L tridecanol as a solvent extraction modifier.

The mixed-metal aqueous feed solution had the following composition: ca. 10–15 mg/L Au, ca. 30 mg/L each Ag, Cu, Fe, Zn, 1 g/l NaCN, pH 10.8.

One volume of the organic extraction solution and two volumes of the aqueous feed solution were placed in a separatory funnel and contacted 10 min. The phases were separated and filtered. The aqueous phase was analyzed for metal concentration by atomic absorption spectroscopy (AAS), as was the original aqueous feed solution. The concentration of metal in the organic phase was then calculated. In some experiments, the metal-loaded organic phase was also analyzed by AAS.

2. Stripping

Equal volumes of metal-loaded organic extraction solution from above and aqueous strip solution (10 g/L NaOH, 5 g/L NaCN) were placed in a separatory funnel and contacted 10 min. The phases were separated and filtered. The aqueous phase was analyzed for metal concentration by atomic absorption spectroscopy (AAS). The concentration of metal in the organic phase was then calculated.

The results are shown in the following Table 9.

TABLE 9

Stripping performance of Aliquat 336 / weak acid solutions
extraction solution: 10 mM Aliquat 336, 10 mM weak acid, 50 g/l
tridecanol in Escaid 110 kerosene
strip solution: 10 g/L NaOH. 5 g/L NaCN. aqueous

| organic weak acid | metal concentration (mg/L) | | | | | | | |
|---|---|---|---|---|---|---|---|---|
| | in loaded organic | | | | in stripped | | | |
| | Au | Ag | Cu | Zn | Au | Ag | Cu | Zn |
| dodecylsalicylaldehyde | 37.6 | 37.8 | 35.4 | 61.2 | 13.8 | 0.80 | 0.00 | 2.50 |
| dodecyl benzenesulfonamide | 37.2 | 31.2 | 22.0 | 58.1 | 12.8 | 0.70 | 0.00 | 1.40 |
| LIX 84 | 32.0 | 46.0 | 49.7 | 60.4 | 30.0 | 20.8 | 0.00 | 55.7 |
| LIX 860 | 32.0 | 40.0 | 47.3 | 59.2 | 16.5 | 0.60 | 0.00 | 4.50 |
| LIX 54 | 33.4 | 47.6 | 51.2 | 59.4 | 20.7 | 5.40 | 3.30 | 9.80 |

We claim:

1. In an extraction system employing a quaternary amine extractant to extract anions from an aqueous solution, the improvement comprising conducting said extraction in the presence of a water insoluble weak organic acid which provides a pH dependent counter-ion thereby confering pH dependent behavior on the quaternary amine system in extraction of said anions.

2. A system as defined in claim 1 wherein said quaternary amine has a cation of the formula

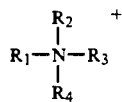

where the R groups $R_1$ through $R_4$ are selected from the group consisting of an ion exchange resin backbone and hydrocarbon radicals having up to 25 carbons and said weak organic acid has a $pK_a$ value in water in the range of about 8–12.

3. A system as defined in claim 2 wherein said weak organic acid is an organic compound which provides an acidic proton and is selected from the group consisting of an alkylphenol, an alkylnaphthol, a hydroxyaryl aldehyde, an alkylbenzenesulfonamide, a hydroxyaryl aldoxime, a hydroxyarylketoxime, a hydroxyaryl ketone, and a beta-diketone.

4. A system as defined in claim 2 wherein said weak organic acid is a compound having the formula selected from the group consisting of:

(a)

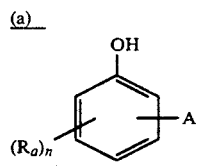

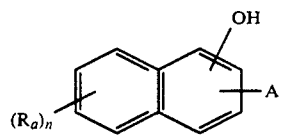

where $R_a$ is a hydrocarbon group having 1 to about 25 carbon atoms, n is an integer of 0 to 4, and A is H or an electron-withdrawing substituent selected from the group consisting of chloro, bromo, —C(=O)$R_b$, or —C(=NOH)$R_b$, where $R_b$ is H or a hydrocarbon group having 1 to about 25 carbon atoms, and provided that the total number of carbon atoms in $R_a$ and $R_b$ is from 6–30;

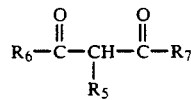

where $R_5$ is H or a hydrocarbon group having 1 to about 25 carbon atoms, $R_6$ is a hydrocarbon group having 1 to about 25 carbon atoms, $R_7$ is a hydrocarbon group having 1 to about 25 carbon atoms, and provided the total number of carbon atoms in $R_5$, $R_6$ and $R_7$ is 10 to 30;

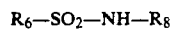

where $R_6$ is as defined above, $R_8$ is H or a hydrocarbon group having 1 to about 25 carbon atoms, and provided the total number of carbon atoms in $R_6$ and $R_8$ is 10 to 30.

5. A system as defined in claim 2 wherein said weak organic acid is a compound selected from the group consisting of nonylphenol, dodecylphenol, nonylsalicylaldehyde, dodecylsalicylaldehyde, dodecylbenzenesulfonamide, 5-nonylsalicylaldoxime, 5-dodecylsalicylaldoxime, 2-hydroxy-5-nonylphenylmethyl ketoneoxime, 2-hydroxy-5-dodecylphenyl methyl ketone oxime and 1-phenyl-1,3-isodecanedione.

6. A system as defined in claim 2 wherein, when none of the R groups $R_1$ through $R_4$ is an ion exchange resin, all the R groups are hydrocarbon radicals containing from 1 to 25 carbon atoms and the sum of the carbon atoms in all the R groups is at least 16 and no more than two of the R groups are methyl.

7. A system as defined in claim 6 wherein at least one of the R groups contains at least 6 carbon atoms and one of the groups is methyl.

8. A system as defined in claim 7 wherein three of the R groups are alkyl groups containing 8 to 10 carbon atoms.

9. A system as defined in claim 2 wherein one of the R groups $R_2$ through $R_4$ is an ion exchange resin backbone and the remaining R groups are aliphatic hydrocarbon groups containing from 1 to 25 carbon atoms.

10. A system as defined in claim 9 wherein the remaining R groups are all methyl.

11. A system as defined in claim 10 wherein said ion exchange resin is a polystyrene divinylbenzene resin having a divinylbenzene content up to 25%.

12. A system as defined in claim 1 wherein said anion is a precious metal complex anion.

13. A system as defined in claim 12 wherein said precious metal is gold or silver.

14. A system as defined in claim 12 wherein said aqueous alkaline solution containing said anion is an alkaline, aqueous, cyanide solution.

15. A process for the recovery of a precious metal from aqueous solutions containing said precious metal, comprising (A) contacting said aqueous solution containing said precious metal in the form of a metal complex anion with an organic phase comprising a water-immiscible solvent, a weak organic acid and a quaternary amine compound having a cation of the formula

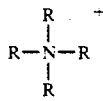

where R is a hydrocarbon radical having from 1-25 carbon atoms and the sum of the carbon atoms in all the R groups is at least 16 and no more than two of the R are methyl, whereby said precious metal complex anion is extracted from said aqueous solution;

(B) separating said aqueous solution from said organic phase containing said quaternary amine; and (C) recovering said precious metal from said organic phase.

16. A process as defined in claim 15 wherein said precious metal is gold or silver.

17. A process as defined in claim 15 wherein the step of recovering said metal from said organic phase comprises stripping said precious metal in the form of its metal complex anion from said organic phase by contacting said organic phase with an aqueous alkaline solution having a pH above 12.

18. A process as defined in claim 17 wherein said aqueous alkaline solution is a NaOH or KOH solution.

19. A process as defined in claim 15 wherein at least one of the R groups in said quaternary amine contains at least 6 carbon atoms.

20. A process as defined in claim 19 wherein three of the R groups contain at least 6 carbon atoms.

21. A process as defined in claim 20 wherein the quaternary amine is tri($C_8$-$C_{10}$)methyl ammonium cation.

22. A process as defined in claim 15 wherein said water immiscible solvent is selected from the group consisting of aliphatic and aromatic hydrocarbons and mixtures thereof having a flash point of at least 150° F.

23. A process as defined in claim 22 wherein said solvent is kerosene.

24. A process as defined in claim 22, wherein said organic phase of said water-immiscible solvent contains from about 0.005 to 20% by weight of said quaternary amine.

25. A process as defined in claim 24 wherein said solvent contains from about 0.01-1% by weight of said quaternary amine.

26. A process as defined in claim 15 wherein said weak organic acid is an organic compound providing an acidic proton and is selected from the group consisting of an alkylphenol, an alkylnapthol, a hydroxyaryl aldehyde, an alkylbenzensulfonamide, a hydroxyarylaldoxime, a hydroxyarylketoxime, a hydroxyarylketone, and a beta-diketone.

27. A process as defined in claim 15 wherein said organic acid is a compound having the formula selected from the group consisting of:

(a)

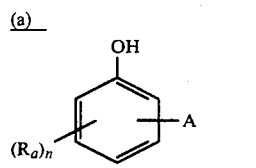

where $R_a$ is a hydrocarbon group having 1 to about 25 carbon atoms, n is an integer of 0 to 4, and A is H or an electron-withdrawing substituent selected from the group consisting of chloro, bromo, —C(=O)$R_b$, or —C(=NOH)$R_b$, where $R_b$ is H or a hydrocarbon group having 1 to about 25 carbon atoms, and provided that the total number of carbon atoms in $R_a$ and $R_b$ is from 6-30;

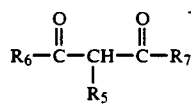

(b)

where $R_5$ is H or a hydrocarbon group having 1 to about 25 carbon atoms, $R_6$ is a hydrocarbon group having 1 to about 25 carbon atoms, $R_7$ is a hydrocarbon group having 1 to about 25 carbon atoms, and provided the total number of carbon atoms in $R_5$, $R_6$ and $R_7$ is 10 to 30;

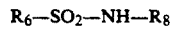 (c)

where $R_6$ is as defined above, $R_8$ is H or a hydrocarbon group having 1 to about 25 carbon atoms, and provided the total number of carbon atoms in $R_6$ and $R_8$ is 10 to 30.

28. A process as defined in claim 15 wherein said weak organic acid is a compound selected from the group consisting of nonylphenol, dodecylphenol, nonylsalicylaldehyde, dodecylsalicylaldehyde, 5-nonylsalicylaldoxime, 5-dodecylsalicylaldoxime, 2-hydroxy-5-nonylphenyl methyl ketone oxime, 2-hydroxy-5-dodecylphenyl methyl ketone oxime, and 1-phenyl-1,3-isodecanedione.

29. A process as defined in claim 28 wherein said quaternary amine is tri($C_8$-$C_{10}$)methyl ammonium cation.

30. A process for the recovery of a precious metal from an aqueous, alkaline, cyanide solution containing said metal in the form of a metal complex anion comprising:
(A) contacting said aqueous solution containing said precious metal with an ion exchange resin carrying quaternary amine functionality whereby said precious metal complex anion is extracted from said aqueous solution, said ion exchange resin carrying said quaternary amine functionality having the formula

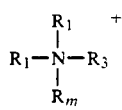

where $R_m$ is the ion exchange resin matrix bonded to the N atom and the remaining R groups $R_1$ through $R_3$ are hydrocarbon groups containing up to 25 carbon atoms, said ion exchange resin also having absorbed thereon and carrying a weak organic acid;
(B) separating said aqueous solution from said ion exchange resin carrying said quaternary amine functionality; and
(C) recovering said precious metal from said ion exchange resin.

31. A process as defined in claim 30 wherein the hydrocarbon groups may be the same or different, saturated or unsaturated, aromatic or aliphatic.

32. A process as defined in claim 30 wherein all of the R groups $R_1$ through $R_3$ are aliphatic hydrocarbon groups having from 1 to 25 carbon atoms.

33. A process as defined in claim 32 wherein all of the R groups $R_1$ through $R_3$ are methyl.

34. A process as defined in claim 30 wherein said weak organic acid is an organic compound providing an acidic proton and selected from the group consisting of an alkylphenol, an alkylnaphthol, a hydroxyaryl aldehyde, an alkylbenzensulfonamide, a hydroxyarylaldoxime, a hydroxyarylketoxime, a hydroxyarylketone, and a beta-diketone.

35. A process as defined in claim 30 wherein said organic acid is a compound having the formula selected from the group group consisting of:

(a)

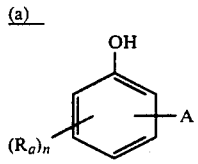

-continued (a)

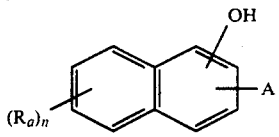

where $R_a$ is a hydrocarbon group having 1 to about 25 carbon atoms, n is an integer of 0 to 4, and A is H or an electron-withdrawing substituent selected from the group consisting of chloro, bromo, —C(=O)$R_b$, or —C(=NOH)$R_b$, where $R_b$ is H or a hydrocarbon group having 1 to about 25 carbon atoms, and provided that the total number of carbon atoms in $R_a$ and $R_b$ is from 6-30;

where $R_5$ is H or a hydrocarbon group having 1 to about 25 carbon atoms, $R_6$ is a hydrocarbon group having 1 to about 25 carbon atoms, $R_7$ is a hydrocarbon group having 1 to about 25 carbon atoms, and provided the total number of carbon atoms in $R_5$, $R_6$ and $R_7$ is 10 to 30;

where $R_6$ is as defined above, $R_8$ is H or a hydrocarbon group having 1 to about 25 carbon atoms, and provided the total number of carbon atoms in $R_6$ and $R_8$ is 10 to 30.

36. A process as defined in claim 30 wherein said weak organic acid is a compound selected from the group consisting of nonylphenol, dodecylphenol, nonylsalicylaldehyde, dodecylsalicylaldehyde, 5-nonylsalicylaldoxime, 5-dodecylsalicylaldoxime, 2-hydroxy-5-nonylphenyl methyl ketone oxime, 2-hydroxy-5-dodecylphenyl methyl ketone oxime, and 1-phenyl-1,3-isodecanedione.

37. A process as defined in claim 30 wherein said precious metal is gold or silver.

38. A process as defined in claim 30 wherein the step of recovering said metal from said ion exchange resin comprises eluting said precious metal in the form of its precious metal complex anion from said ion exchange resin by contacting said ion exchange resin with an aqueous alkaline solution having a pH above 12.

39. A process as defined in claim 38 wherein said aqueous alkaline solution is a NaOH or KOH solution.

40. A process as defined in claim 30 wherein said ion exchange resin is a polystyrene divinylbenzene resin.

41. An ion exchange resin carrying quaternary amine functionality and further carrying a weak organic acid, said weak organic acid being an organic compound having a p$K_a$ in water of about 8-12 and being capable of providing an acidic proton.

42. An ion exchange resin as defined in claim 41 wherein said weak organic acid is selected from the group consisting of an alkylphenol, an alkylnaphthol, a hydroxyaryl aldehyde, an alkylbenzensulfonamide, a hydroxyarylaldoxime, a hydroxyarylketoxime, a hydroxyarylketone, and a betadiketone.

43. An ion exchange resin as defined in claim 41 wherein said organic acid is a compound having the formula selected from the group consisting of:

(a)

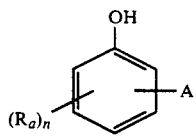
I

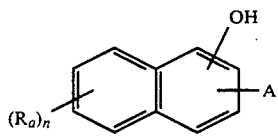
II where $R_a$ is a hydrocarbon group having 1 to about 25 carbon atoms, n is an integer of 0 to 4, and A is H or an electron-withdrawing substituent selected from the group consisting of chloro, bromo, —C(=O)$R_b$, or —C(=NOH)$R_b$, where $R_b$ is H or a hydrocarbon group having 1 to about 25 carbon atoms, and provided that the total number of carbon atoms in $R_a$ and $R_b$ is from 6-30;

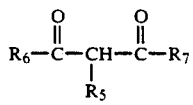
(b)

where $R_5$ is H or a hydrocarbon group having 1 to about 25 carbon atoms, $R_6$ is a hydrocarbon group having 1 to about 25 carbon atoms, $R_7$ is a hydrocarbon radical having 1 to about 25 carbon atoms, and provided the total number of carbon atoms in $R_5$, $R_6$ and $R_7$ is 10 to 30;

$$R_6—SO_2—NH—R_8 \qquad (c)$$

where $R_6$ is as defined above, $R_8$ is H or a hydrocarbon group having 1 to about 25 carbon atoms, and provided the total number of carbon atoms in $R_6$ and $R_8$ is 10 to 30.

44. An ion exchange resin as defined in claim 41 wherein said weak organic acid is a compound selected from the group consisting of nonylphenol, dodecylphenol, nonylsalicylaldehyde, dodecylsalicylaldehyde, 5-nonylsalicylaldoxime, 5-dodecylsalicylaldoxime, 2-hydroxy-5-nonylphenyl methyl ketone oxime, 2-hydroxy-5-dodecylphenyl methyl ketone oxime, and 1-phenyl-1,3-isodecanedione.

* * * * *